United States Patent [19]
Engstrom

[11] 3,718,950
[45] March 6, 1973

[54] FASTENING DEVICE FOR DETACHABLY SECURING TWO MEMBERS TOGETHER

[75] Inventor: John Bertil Engstrom, Helsingor, Denmark

[73] Assignee: T. Praestmark, Copenhagen, Denmark

[22] Filed: Jan. 12, 1972

[21] Appl. No.: 217,145

[30]     Foreign Application Priority Data

Jan. 27, 1971   Denmark..............................341/71

[52] U.S. Cl.....................................24/217, 24/221 K
[51] Int. Cl..............................................A44b 17/00
[58] Field of Search..........24/217, 221 K, 230 NP, 230 TC, 24/221 A

[56]             References Cited

UNITED STATES PATENTS

| | | | |
|---|---|---|---|
| 2,252,286 | 8/1941 | Hathorn | 24/221 K |
| 2,552,066 | 5/1951 | Sorensen | 24/217 |

*Primary Examiner*—Bernard A. Gelak
*Attorney*—Dennison, Dennison, Townshend & Meserole

[57]              ABSTRACT

A fastening device for detachably securing together a member, such as a plate member, having a stud rotatably and axially movably mounted therein, and another member which may also be a plate member, and which is provided with one or more detent members adapted to cooperate with one end of the stud. At the other end the stud may for example be provided with a head, which may be similar to a screw head, and a spring member is biasing the stud axially in relation to the plate member in which it is mounted and tends to move the head of the stud away from the associated plate member. The end of the stud adapted to cooperate with the detent members is provided with axially spaced shoulders preferably forming parts of notches into which the said detent members may snap so as to lock the stud, when the stud is moved axially against the force exerted by the spring member. The said shoulders are shaped in such a manner that the stud may be locked merely by depressing the head thereof despite of its angular position, and released by rotating the stud in any direction.

9 Claims, 7 Drawing Figures

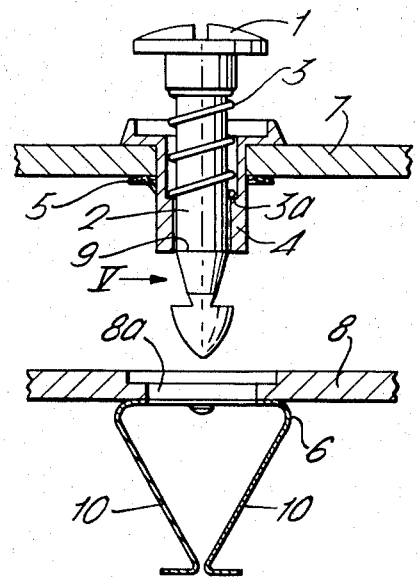
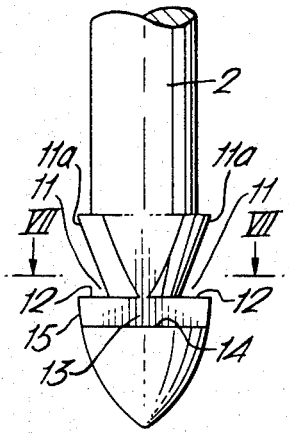 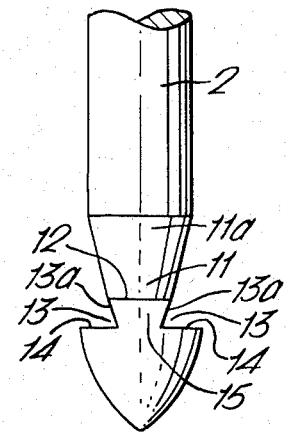 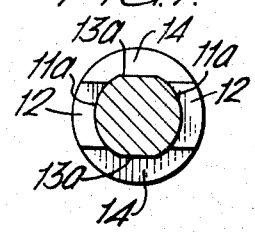

FASTENING DEVICE FOR DETACHABLY SECURING TWO MEMBERS TOGETHER

BACKGROUND OF THE INVENTION

1. Field of the Invention

The present invention relates to a fastening device for detachably securing two members together, and more specifically the invention relates to a fastening device for fastening two plate members together and being of the snap locking type having a stud cooperating with spring actuated or springy detent members.

Fastening devices of the type described may for example advantageously be used for detachably fastening caps or covers to casings or other members, and for fastening panel-like covers to walls, for example panel-like covers for fuse boxes in busses, trains and the like.

2. Description of the Prior Art

British Patent No. 507,249 discloses a fastening device of the type described and having a stud member with a head at one end, said stud member being rotatably mounted at said end in a socket member fastened to a first plate member. At the end portion opposite to that comprising the head the stud is provided with two diametrically oppositely arranged notches, and a pair of springy, oppositely arranged detent members fastened to another plate member are adapted to snap into locking engagement with said notches when the stud is pushed in between the detent members. It is understood, however, that the said locking engagement cannot be obtained in any angular position of the stud. Therefore, in using the fastening device disclosed in the above British patent specification it is important to place the stud in such an angular position that each notch of the stud is axially opposite to the corresponding detent member before depressing the stud in between the detent members. The known fastening device may be released by rotating the head of the stud approximately 90°, whereby the detent members are opened by cam action, and then retracting the stud from the detent members.

SUMMARY OF THE INVENTION

The fastening device according to the invention and for detachably securing first and second members together comprises socket means in said first member, a stud arranged rotatably and axially movably in said socket means, a first end portion of the stud comprising first and second axially spaced shoulders extending combined over the entire circumference of said first end portion, each of the axially spaced shoulders extending over only part of said circumference, spring means biasing said stud axially in the direction of the second end portion thereof and in relation to said first member, and detent means on said second member and being resiliently biased so as to be able to snap into locking engagement with said shoulders when the stud is moved axially in the direction of said first end portion against the force excerted by said spring means.

Due to the fact that said spaced shoulders extend combined over the entire circumference of said first end portion of the stud the detent means will snap into locking engagement with at least one of the spaced shoulders when the first end portion of the stud is moved axially in relation to and past the detent means, irrespective of the angular position of the stud. Said spaced shoulders may circumferentially overlap each other to some extent, and the term "axially spaced shoulders extending combined over the entire circumference of said first end portion" is intended to express that any plane passing through the longitudinal axis of said first end portion of the stud intersects at least one of said axially spaced shoulders at each of opposite sides of the stud. That means that a detent member being moved axially in relation to said first end portion and resiliently biased towards the axis of the end portion will have the chance of snapping into engagement with at least one of said spaced shoulders irrespective of the relative angular position of the stud.

When the detent means have been brought into locking engagement with either of the spaced shoulders the said first and second members will be pressed against each other by the spring means acting on as well the first member as on the stud.

Because each of the axially spaced shoulders extends over only part of the circumference of said first end portion of the stud the fastening device according to the invention may be released by rotating the stud a certain angle, whereby the detent means will be pressed outwardly by cam action in a similar way as described above in connection with the known device. When the detent means have been brought out of engagement with the shoulders the said spring means will move the stud in an axial direction so as to disengage the stud from the detent means. When the detent means are in locking engagement with the innermost of said spaced shoulders it may be necessary to perform the releasing operation in two steps, because after having been removed from the innermost shoulders the detent means may snap into locking engagement with the outermost of said spaced shoulders.

The first end portion of the stud may comprise axially spaced pairs of diametrically oppositely arranged shoulders, said detent means comprising two detent members resiliently biased towards each other and adapted to engage with either of said pairs of shoulders. Said shoulders may advantageously be formed by providing notches in said first end portion of the stud, and the detent members may be formed by end portions of flat spring members.

BRIEF DESCRIPTION OF THE DRAWINGS

The invention will now be further described with reference to the accompanying drawings, wherein FIG. 4 is a view corresponding to that of FIG. 2 of a second embodiment of the fastening device according to the invention, FIG. 5 is an enlarged view of the lower end of the locking stud as shown in FIG. 4, FIG. 6 is an enlarged view corresponding to that of FIG. 5 where the locking stud has been rotated 90° in relation to the position shown in FIG. 5, and FIG. 7 is a cross sectional view as indicated by the sectional line VII — VII in FIG. 5.

DESCRIPTION OF THE PREFERRED EMBODIMENTS

Figure 1:
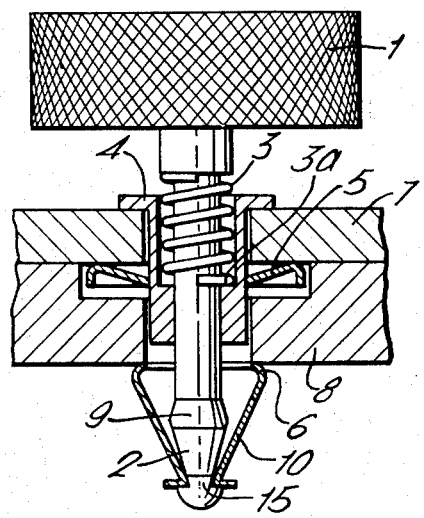
FIG. 1 is a partially sectional view of a first embodiment of the fastening device according to the invention in its locked position.

The embodiments shown on the drawings comprise a socket 4 and a locking stud 2 which is rotatably and axially displaceably mounted in the socket. At one end the locking stud 2 is provided with a knob or head 1, and the adjacent end portion of the locking stud 2 is surrounded by a coil spring 3, the ends of which engage an inner shoulder 3a in the socket 4 and the knob or head 1, respectively, whereby the spring 3 tends to bias the locking stud 2 and the socket 4 in opposite directions. Axial movement of the locking stud 2 in relation to the socket 4 is, however, limited by an abutment or shoulder 9 which may engage with the adjacent end surface of the socket 4. The socket 4 and the locking stud 2 arranged therein may be mounted in a plate member 7 or another member which is to be fastened by means of the fastening device. In the drawings the socket 4 is fixed in a bored hole in the plate member 7 by means of a locking ring 5 or a similar fastening member.

The drawings show a wall or second plate member 8 to which the plate member 7 should be fastened. This plate member 8 comprises an aperture or an opening 8a, and a spring member 6 having oppositely arranged springy fingers or legs 10 is mounted on one side of the plate member 8 around the aperture 8a.

The end portion of the locking stud 2 opposite to the handle or head 1 comprises two pairs of oppositely arranged notches 11 and 13, respectively. These notches form axially spaced pairs of substantially radially extending abutments or shoulders, vide especially FIGS. 5 – 7. In the embodiments shown on the drawings, the notches 11 and 13 extend in directions substantially at right angles, and the pairs of abutments or shoulders 12 and 14 extend in combination over the entire circumference of the end portion of the stud. This is a very important feature for reasons which will become apparent from the following specification. The surface part 11a (FIGS. 5 – 7) partly defining the notch 11 may advantageously be part of a cone surface, whereas the surface part 13a partly defining the notch 13 is preferably plane.

Figure 2:
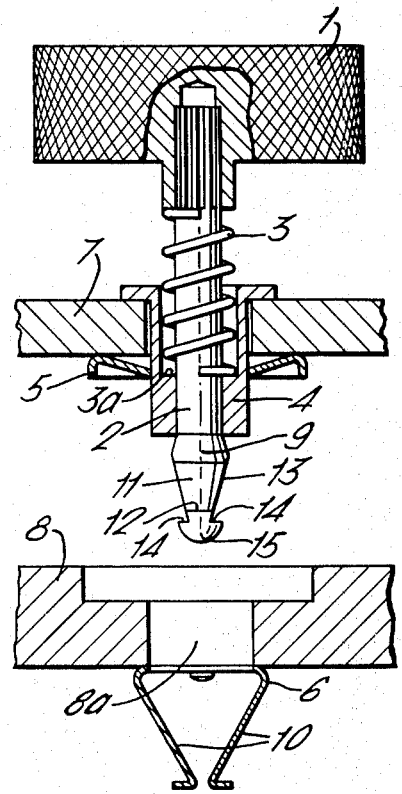
FIG. 2 is a view corresponding to that of FIG. 1 showing the fastening device in its unlocked position.
Figure 3:
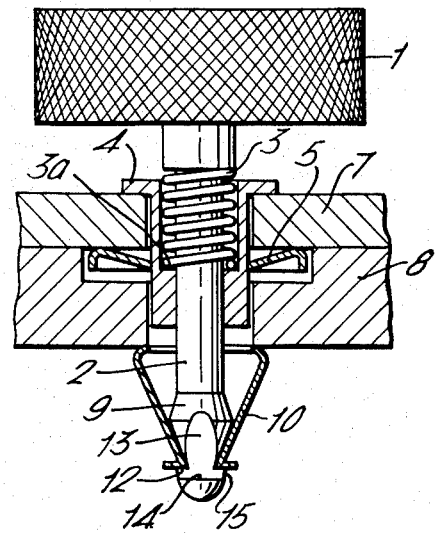
FIG. 3 is a view corresponding to that of FIG. 1, the locking stud having been rotated about 90° in relation to the position shown in FIG. 1.

In the embodiments shown in FIGS. 1 – 3 the head 1 has the form of a knurled knob, whereas in the embodiment shown in FIG. 4 the head 1 is similar to a screw head which may be partly adopted in the socket 4 in the locked position of the locking stud 2.

In the unlocked positions of the fastening devices shown in FIG. 2 and 4 the locking stud 2 will take up an axial position in which the head 1 projects from the outer surface of the plate member 7 and thereby clearly indicates that the fastening device is unlocked. The plate member 7 may now be fastened to the wall or plate member 8 by moving the notched end portion of the locking stud 2 axially through the aperture 8a in the plate member 8 and in between the springy fingers 10. This may be done by depressing the stud 2 in relation to the plate member 7 so that the coil spring 3 is compressed. If the locking stud is depressed axially in relation to the fingers 10 in the mutual angular positions shown in FIG. 1 the free end portions of the fingers 10 forming detent members will snap into locking engagement with the notches 13, and when the inwardly directed pressure exerted on the head 1 is released the detent members will abut the shoulders 14 and retain the stud 2 in its depressed position. Now the spring 3 is compressed, and the force exerted by the compressed spring will press the plate members 7 and 8 together. In case the locking stud 2 is in the angular position shown in FIG. 3 when depressed axially the detent members or fingers 10 will snap into locking engagement with the notches 11 and abut the shoulders 12. It should be understood that due to the fact that the axially spaced pairs of shoulders 12 and 14 extend combined over the entire circumference of the end portion of the stud, the detent members or fingers 10 will snap into locking engagement with either the notches 11 or the notches 13 when axially depressing the stud in between said fingers 10, despite of the rotational position of the stud in relation to the fingers 10. Therefore, when the plate members 7 and 8 are fastened together by means of the fastening device according to the invention it is unnecessary to pay any attention to the rotational position of the locking stud 2, but fastening may be obtained by a simple axial depression of the stud.

The fastening device according to the invention may be released by imparting a simple rotational movement to the head 1 of the stud 2. In case the resilient fingers 10 are in locking engagement with the notches 13 and the shoulders 14 the said rotational movement of the stud 2 brings the fingers 10 in engagement with the stud parts 15 between the notches 13. These parts 15 will open the fingers 10 by cam action, and when the stud has been rotated not more than approximately 90° the end portion of the stud will automatically be retracted from the free end of the fingers under the influence of the spring force exerted by the spring 3. If in the locking position of the fastening device the fingers 10 are alternatively in engagement with the notches 11 and the shoulders 12 a rotational movement of the stud not more than approximately 90° will bring the detent members or the free ends of the fingers 10 into engagement with the inwardly inclined surface parts 13a, whereby the spring 3 will move the stud 2 axially till the fingers 10 come into engagement with the shoulders 14. Now a further rotational movement of the stud 2 will cause that the fastening device is released in the manner just described above. It is appreciated that the fastening device according to the invention may in all cases by released by a suitable rotational movement of the head 1 of the stud 2 in any direction.

The embodiments shown on the drawings may be adapted to plate members having other wall thicknesses by adapting the length of the stud 2, and the force pressing the plate members 7 and 8 together in the locking position of the fastening device may be changed by replacing the spring 3 by another spring with a different spring force.

It should be understood that various changes and modifications of the described embodiments may be made without departing from the scope of the invention. For example, the fastening device may have only one spring biased detent member adapted to snap into engagement with axially spaced shoulders on the locking stud. These shoulders may, for example, be provided by forming flange-like parts or other radially projecting parts on the end portion of the stud 2 rather than by forming notches therein.

I claim:

1. A fastening device for detachably securing first and second members together, said device comprising socket means mounted in said first member, a stud arranged rotatably and axially movable in said socket means, a first end portion of the stud comprising first and second axially spaced shoulders extending combined over the entire circumference of said first end portion, each of the axially spaced shoulders extending over only part of said circumference, spring means biasing said stud axially in the direction of the second end portion thereof, and in relation to said first member, and detent means arranged on said second member and being resiliently biased so as to be able to snap into locking engagement with said shoulders when the stud is moved axially in the direction of said first end portion against the force exerted by said spring means.

2. A fastening device according to claim 1, wherein said first end portion comprises axially spaced pairs of diametrically oppositely arranged shoulders, said detent means comprising two detent members resiliently biased towards each other and adapted to engage with either of said pairs of shoulders.

3. A fastening device according to claim 2, wherein said second member defines an opening therein, said stud extending through said opening in its locked position, and said detent means being arranged on said second member at the surface thereof being opposite to that adjacent to said first member in the said locked position.

4. A fastening device according to claim 3, wherein said detent members are formed by end portions of flat spring members.

5. A fastening device for detachably securing a first plate member to a second plate member in superposed relationship, said device comprising a socket mounted in said first plate member, a stud arranged rotatably and axially movable in said socket, a first end portion of the stud comprising two spaced pairs of diametrically oppositely positioned shoulders, said two pairs of shoulders extending combined over the entire circumference of said first end portion and each pair of shoulders extending over only part of said circumference, spring means biasing said stud axially in the direction of a second end portion of the stud and in relation to said first plate member, a pair of oppositely arranged detent members resiliently biased towards each other so as to be able to snap into locking engagement with either of said pairs of shoulders when the stud is moved axially in the direction of said first end portion against the force exerted by said spring means, whereby the stud may be locked in any rotational position thereof when said axial movement is provided, and released by rotating the stud in any direction.

6. A fastening device according to claim 5, wherein the wall of said second plate member defines an opening therein, said stud extending through said opening in its locked position, and the detent members being arranged at the surface of said second member opposite to that engaging said first plate member in said locked position.

7 A fastening device according to claim 6, wherein said detent members are formed by end portions of flat spring members extending over the opening in said second plate member.

8. A fastening device according to claim 5, wherein said second end portion of the stud comprises a head similar to the head of a screw.

9. A fastening device according to claim 6, wherein said spaced shoulders partly define two pairs of angularly displaced notches in said first end portion of the stud.

* * * * *